United States Patent [19]
Kasugai et al.

[11] Patent Number: 5,238,136
[45] Date of Patent: Aug. 24, 1993

[54] CAP WITH VALVE

[75] Inventors: Joji Kasugai; Norikazu Hosokawa, both of Aichi, Japan

[73] Assignee: Toyoda Gosei Co., Ltd., Nishikasugai, Japan

[21] Appl. No.: 857,412

[22] Filed: Mar. 25, 1992

[30] Foreign Application Priority Data

Mar. 26, 1991 [JP] Japan .................. 3-060651

[51] Int. Cl.⁵ .................................. B65D 53/00
[52] U.S. Cl. ................. 220/304; 220/DIG. 33; 277/206 R
[58] Field of Search ....... 220/203, 304, 378, DIG. 33; 277/207 R, 207 A, 206 R

[56] References Cited

U.S. PATENT DOCUMENTS

| | | | |
|---|---|---|---|
| 2,733,831 | 2/1956 | Nehls | 220/304 X |
| 4,102,472 | 7/1978 | Sloan, Jr. | 220/295 |
| 4,460,104 | 7/1984 | Kitsukawa | 220/304 |
| 4,572,386 | 2/1986 | Kasugai et al. | 220/203 |
| 4,588,102 | 5/1986 | Kasugai | 220/203 |

FOREIGN PATENT DOCUMENTS 1-111669 4/1989 Japan .

Primary Examiner—Allan N. Shoap
Assistant Examiner—Nova Stucker
Attorney, Agent, or Firm—Cushman, Darby & Cushman

[57] ABSTRACT

A cap with valve includes a cap body 1, a flange portion 5, and a gasket 11. The cap body 1 has an external threaded portion 2 for threadedly engaging a fuel supply inlet. The flange portion 5 extends outwardly in the radial direction from an upper portion of the cap body 1. The annular gasket 11 has a substantially circular cross-section, and is disposed on a sealing surface of the flange portion 5. This gasket 11 has a projecting portion 15A in contact with flange portion 5 and this projecting portion extends along the entire circumference of the toroidal gasket 11. The projecting portion 15 A absorbs surface irregularities on flange portion 5 thus eliminating the need for additional manufacturing steps, such as grinding, thereby reducing the manufacturing cost of the cap with valve.

4 Claims, 2 Drawing Sheets 5,238,136

CAP WITH VALVE

BACKGROUND OF THE INVENTION

1. Field of the Invention

The present invention relates to a cap with valve, such as a fuel cap installed to a fuel supply inlet that extends from a fuel tank of an automobile.

2. Description of the Prior Art

Conventionally, a cap with valve, for example, a fuel cap to be installed to a filler neck of a fuel tank is comprised of a cap body, a flange portion extending from the upper portion of the cap body outwardly in the radial direction, and a doughnut-shaped gasket disposed on the lower or sealing surface of the flange. The fuel cap is designed to cover a fuel supply inlet extending from the fuel tank while screwed into the fuel supply inlet (see Japanese Patent Unexamined Publication No. 111669/1989).

The conventional cap body has an upper portion and a threaded cylindrical portion attached to one of the upper portion for threadedly engaging the female threads of the fuel supply inlet.

The gasket is brought into pressure contact with both the sealing surface of the flange portion and an end surface of the fuel supply inlet when the cap body is screwed into the fuel supply inlet, thus sealing the fuel supply inlet hermetically.

However, in the conventional fuel cap, when the cap body is made from synthetic resin, the cap body must be formed by splitting its outer circumference into two parts in order to separate the mold, e.g., in the radial direction, because the cap body has a male thread on the threaded cylindrical portion.

As a result, parting lines are drawn not only on the outer surface of the cap body but also on the sealing surface of the flange portion.

Since the presence of the parting line on the sealing surface of the flange portion affects the gasket's sealability, the sealing surface of the flange portion must typically be ground to remove the burr after having been formed, hence increasing the number of manufacturing steps as well as the manufacturing cost of the fuel cap.

The above problems likewise occur in the case where the flange portion of the fuel cap is made of metal. Frequently, metal fuel caps contain burrs or other irregularities which the standard gasket is unable to seal. The end of the fuel supply inlet also frequently has burrs causing problems for the conventional gasket.

SUMMARY OF THE INVENTION

The invention has been made to overcome the above problems. Accordingly, an object of the invention is to provide a cap with a valve in which the manufacturing step of grinding the parting line on the flange is eliminated by using a gasket which compensates for the parting line yet effects a seal thus reducing the number of manufacturing steps as well as the manufacturing cost.

To achieve the above object, a cap with a valve for covering a fuel supply inlet extended from a fuel tank when threadedly engaged with the fuel supply inlet, comprises a cap body having a threaded portion for threadedly engaging the female threads of the fuel supply inlet; a flange portion extending from an upper portion of the cap body outwardly in the radial direction; and a toroidal gasket being disposed on the sealing surface of the flange portion to be brought into pressure contact with an end surface of the fuel supply inlet and having a substantially circular section; wherein the gasket has projecting portions spaced on a cross-sectional circumference so as to be brought into contact with the sealing surface of the flange portion.

In a first embodiment, the cap with valve of the invention includes an annular, toroidal or doughnut-shaped gasket having a plurality of projecting portions spaced on a cross-sectional circumference and extending along the entire circumference of the gasket so as to be brought into contact with the sealing surfaces of the flange portion. Thus, even if burrs or some irregularities are present on the sealing surfaces of the flange portion, the projecting portions of the gasket come in line contact with the burrs or irregularities present on the sealing surfaces of the flange portion. Because the contact area of the projecting portions is less than that of a conventional gasket, the force exerted per unit on the gasket of the present invention is increased thereby increasing seal effectiveness. The projecting portions are particularly effective in absorbing burrs and irregularities present on the sealing surfaces.

Therefore, the cap with valve of the present invention can seal the sealing surfaces of the flange portion hermetically without the necessity of having to grind the parting line on the flange so that the gasket can affect a seal. Thus, the gasket reduces not only the number of manufacturing steps but also the manufacturing cost of the cap body.

In a second embodiment, the cap with valve includes all of the features of the first embodiment, with the additional feature that the toroidal gasket has projecting portions for being brought into pressure contact with the end surface of the fuel supply inlet. In the same manner as described above, the projecting portions compensate for burrs or other surface irregularities present in the end of the fuel supply inlet without the necessity of having to remove the burrs or surface irregularities on the end surface of the fuel supply inlet. Thus, the manufacturing cost of the fuel supply inlet is reduced.

DETAILED DESCRIPTION OF THE PREFERRED EMBODIMENT

The embodiments of the invention will now be described with reference to the accompanying drawings.

Figure 1:
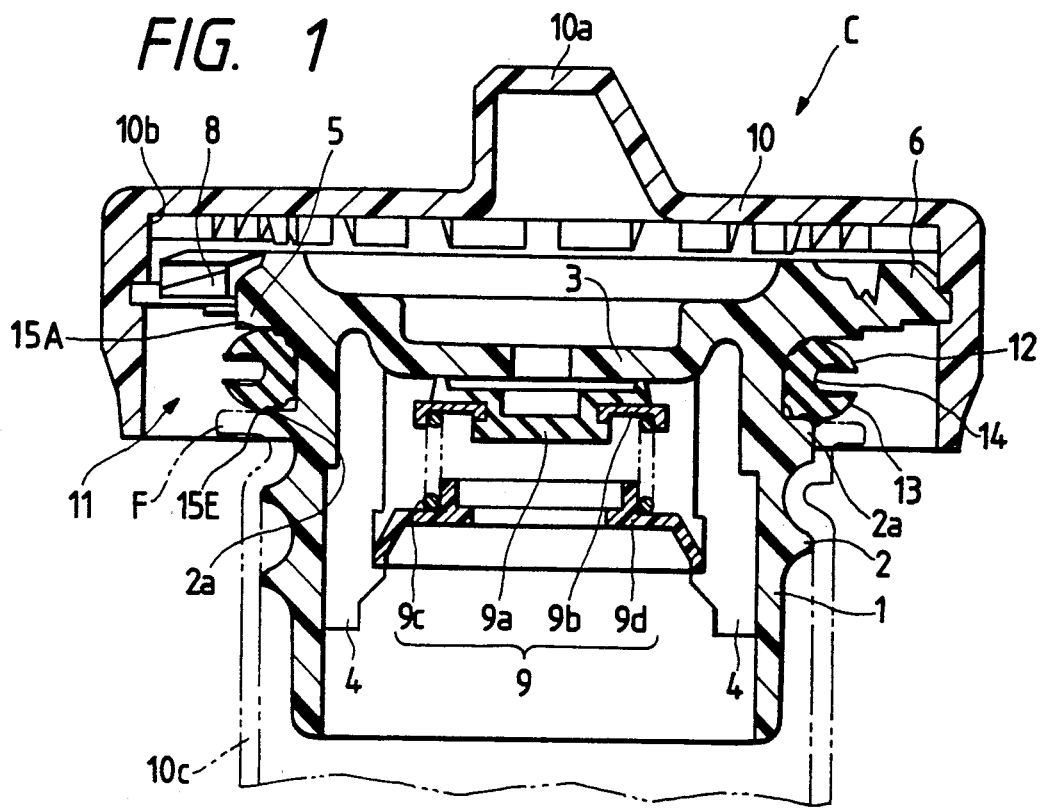
FIG. 1 is a sectional view of an embodiment of the invention, which is a fragmentary sectional view of the embodiment shown in FIG. 3.
Figure 3:
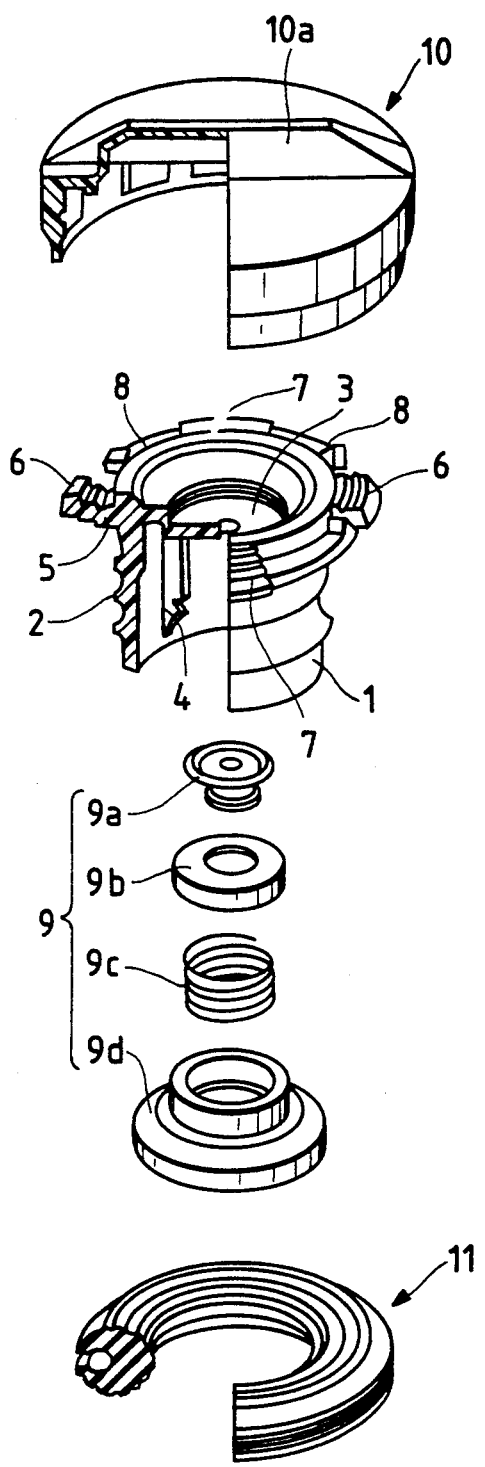
FIG. 3 is an exploded perspective view of the embodiment of the invention.

As shown in FIGS. 1 and 3, a fuel cap C, which comprises one embodiment of the invention, includes: a cap body 1; a flange portion 5 extending from an upper portion of the cap body i outwardly in the radial direction; and a toroidal gasket 11 disposed on the sealing surface of the flange portion 5.

The cap body 1 is made of a synthetic resin such as polyacetal in substantially cylindrical form and has a male threaded portion 2 for threadedly engaging the fuel supply inlet 100. Also, a top plate 3 and a plurality of holding ribs 4 as well as a valve mechanism 9 are formed on the inner circumferential surface of the cap body 1. The valve mechanism 9 consists of a valve body 9a, a plate 9b, a spring 9c, and a spring seat 9d.

The flange portion 5 on the outer upper portion of the cap body 1 has two types of support members 6 and 7, each being provided in pairs and extending outwardly in the radial direction. The support members 6 serve as stoppers of a cover 10 made of a synthetic resin such as polyamide, the cover closing the upper portion of the cap body 1. The support members 7 provide spacing for torque regulating arms 8 so that the arms can protrude in the circumferential direction of the cap body 1. When the fuel cap C is being installed to the fuel supply inlet 100 by holding member 10a of the cover 10, or when the torque becomes excessive, these regulating arms 8 flex thereby disengaging with projections 10b which allows the cover 10 to rotate idly relative to the cap body 1.

Further, between the flange portion 5 and the cap body 1 is a gland into which the gasket 11 is to be placed. The outside diameter of portion 2a is smaller than the major diameter of the external threaded portion 2 of the cap body 1, facilitating the placement of the gasket 11 to abut against the flange portion F of the fuel supply inlet 100. This also allows the gasket 11 to be put in the correct position under the sealing surface of the flange portion 5 easily and accurately.

To mold the cap body 1 including the flange portion 5, a total of four split molds are prepared and an injection molding method is employed. The four split molds are: two split molds prepared by splitting the lower surface of the flange portion 5 from the outer circumferential portion of the cap body 1 in the longitudinal direction; a split mold for molding the lower surface of the top plate 3 on inner circumference of the cap body 1; and a split mold for molding the upper surface of the top plate 3 of the cap body 1, the upper surface of the flange portion 5, and the like.

The gasket 11 is formed of an elastomer such as NBR (butadiene-acrylonitrile rubber) or PVC (polyvinyl chloride) in toroidal shape by injection molding or the like so that the gasket 11 can be arranged at a predetermined position on the sealing surface of the flange portion 5. Further, the end surface of the fuel supply inlet is subjected to dusting with molybdenum disulfide or to chlorination, to improve slidability between the gasket 11 and the flange portion F of the fuel supply inlet 100. To form lip elements 12, 13 at both upper and lower positions in the section of the gasket 11, a crescent-like recessed portion 14 extends radially inwardly from an exterior surface of the gasket along the entire circumference of the gasket.

Figure 2:
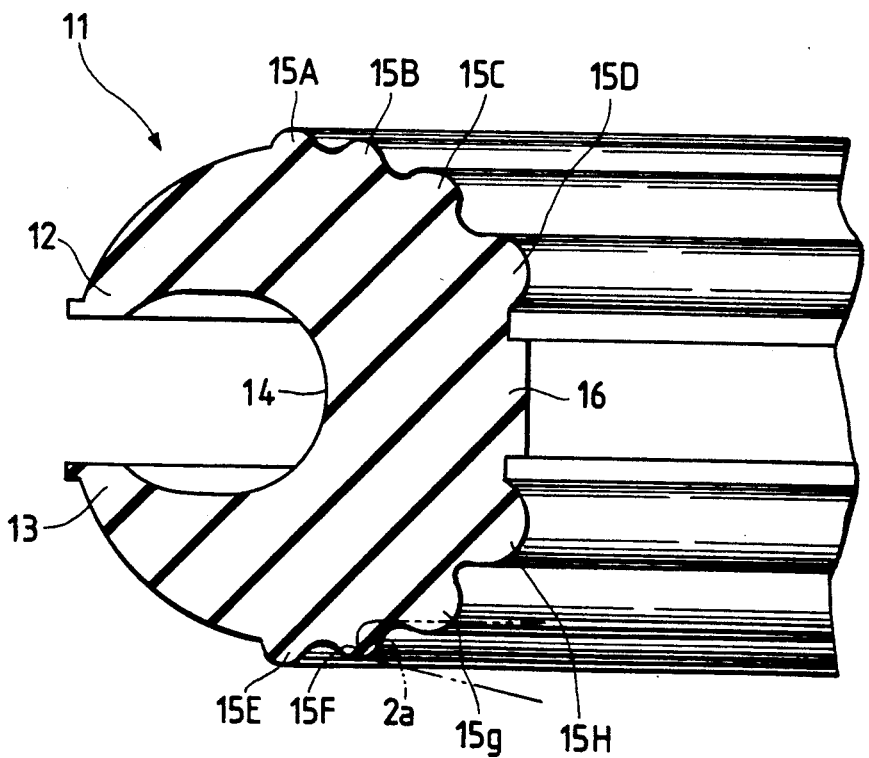
FIG. 2 is a sectional view of a gasket used in the embodiment of the invention.

In the second embodiment, as shown in FIG. 2, the gasket 11 includes a plurality of projecting portions 15 (15A, 15B, 15C, 15D, 15E, 15F, 15G, 15H), spaced on a cross-sectional circumference of the gasket and extending along the entire circumference of the gasket. Projecting portions 15A, 15B, 15C, 15D, 15F, 15G and 15H are in contact with the cap body 1. At least projecting portion 15E can be brought into pressure contact with an end surface of the fuel supply inlet 100. In the first embodiment, projecting portions 15A, 15B, 15C and 15D are in contact with the cap body 1. These projecting portions 15 have semicircular sections with successive projecting portions 15 becoming gradually larger from the projecting portion 15A to 15D and from 15G to 15E. The spacing of the projecting portions 15 is gradually larger between successively larger projecting portions 15. Reference numeral 16 designates a film gate mark.

In the embodiment shown in FIG. 1, when the cap body 1 is screwed into the fuel supply inlet 100, the gasket 11 is brought into pressure contact with both the sealing surface or flange F of the flange portion 5 and the end surface of the fuel supply inlet 100. Projecting portion 15A contacts the sealing surface of the flange portion 5.

In this case, even if burrs or parting lines have note been ground off which were produced during molding of the lower surface of the flange portion 5, the contact area between gasket 11 and the sealing surface has been reduced because the projecting portion 15A comes in line contact with the sealing surface of the flange portion 5, compared with the conventional gasket that is in a plane contact state. As a result, the force per unit area between the gasket 11 and the sealing surface of the flange is increased, which compensates for or absorbs the burrs, irregularities, and the like that are present on the sealing surface.

Therefore, the fuel cap C can be sealed between the surface of the flange portion 5 and the gasket 11 hermetically without the necessity for grinding the lower sealing surface of the flange portion 5. This reduces the number of manufacturing steps as well as the manufacturing cost.

In the embodiment shown in FIG. 1, the projecting portion 15E is provided to be brought into pressure contact with an end of fuel supply inlet 100 when the cap body 1 is screwed into the fuel supply inlet 100. Projecting portion 15E seals cap body 1 to flange portion F of the fuel supply inlet 100 in like manner as projecting portion 15A sealed the sealing surface of the flange portion 5. Thus, even if there are some irregularities or the like present on the flange portion F, these irregularities or the like are absorbed by gasket 11 creating an hermetic seal between cap body 1 and flange F of the fuel supply inlet 100. Thus, the grinding, etc., of the flange portion F of the fuel supply inlet 100 can also be avoided.

Further, in the fuel cap C, a plurality of projecting portions 15B, 15C, 15D, 15E, 15F, 15G, 15H, each having a different size, are in pressure contact with cap body 1 as shown in FIG. 1. Thus, even if there is some variation in the size of irregularities, such as burrs present not only on the lower surface of the flange portion 5, but also around the outer circumferential surface of the cap body 1, these projecting portions 15 provide additional seal contact points enabling the gasket 11 to create a seal with cap body 1.

Still further, the fuel cap C is so designed that, as shown in FIGS. 1 and 2, an upper end portion 2a of the external thread portion 2 on the cap body 1 can be positioned between the projecting portions 15F, 15G on inner circumference of the gasket 11, so that the gasket 11 can be arranged in proper place without being twisted when installed to the cap body 1. Also, when the fuel cap C is installed to the fuel supply inlet 100, even if the gasket 11 is about to be twisted while brought into sliding contact with the flange portion F of the fuel supply inlet 100, the upper end portion 2a is fitted between the projections 15F, 15G, thus preventing the gasket 11 from being twisted.

Still further, while the fuel cap C whose flange portion 5 is made of a synthetic resin has been described in the embodiment, the invention is also applicable to a case in which the flange portion 5 is made of metal.

Still further, while the gasket 11 having the recessed portion 14 and a crescent-like section has been indicated in both embodiments, the invention may, of course, be applicable to a gasket having no recessed portion 14 and having a substantially circular section.

What is claimed is:

1. A cap with valve for covering a fuel supply inlet, comprising:

a cap body having an upper portion and an externally threaded cylindrical portion attached to one side of said upper portion for threadedly engaging said fuel supply inlet;

a flange portion extending from said upper portion of the cap body outwardly in the radial direction and having a sealing surface; and an annular gasket having a first annular portion disposed in contact with said sealing surface of said flange portion and having a second annular portion for pressure contacting an end surface of said fuel inlet, said gasket having a substantially circular periphery extending from said first portion of said gasket to said second annular portion of said gasket on an inner side of said gasket, said gasket having a plurality of annular projecting portions projecting from and being spaced around said circular periphery of said first portion of said gasket for contacting said sealing surface of said flange portion, said projecting portions having a projecting length which is gradually larger for successive projecting portions from said first portion of said gasket toward said second portion of said gasket.

2. A cap with valve as claimed in claim 1, wherein said annular gasket has an annular recessed portion extending radially inwardly from an exterior surface of said gasket.

3. A cap with valve as claimed in claim 1, further comprising:

said gasket having a plurality of annular projecting portions projecting from and being spaced around said circular periphery of second portion of said gasket for pressure contacting an end surface of said fuel supply inlet.

4. A cap with valve as claimed in claim 3, wherein the spacing of said projecting portions is gradually larger for successive projecting portions from at least one of said upper and lower portions toward said inner side of said gasket.

* * * * *